Feb. 8, 1966     W. G. MULHOLLAND     3,234,066
PROCESS FOR PRODUCING THIN LAMINATED PLASTIC FILMS
Filed May 11, 1962                             2 Sheets-Sheet 1
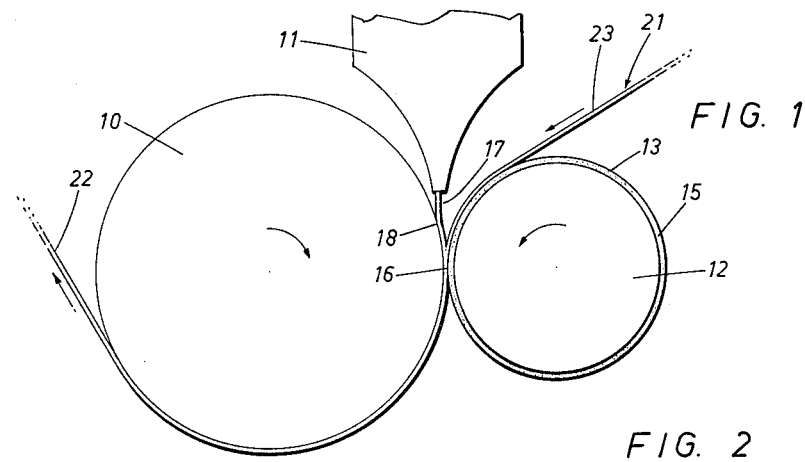
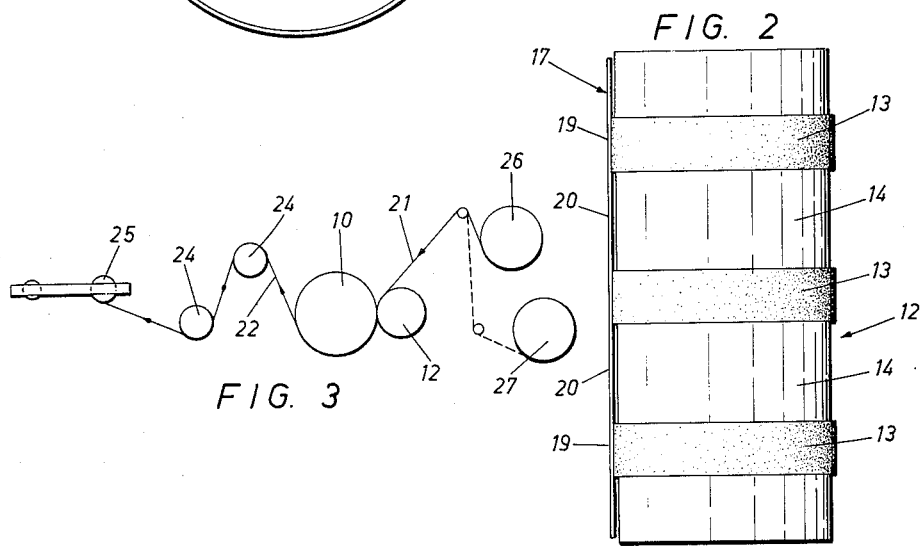
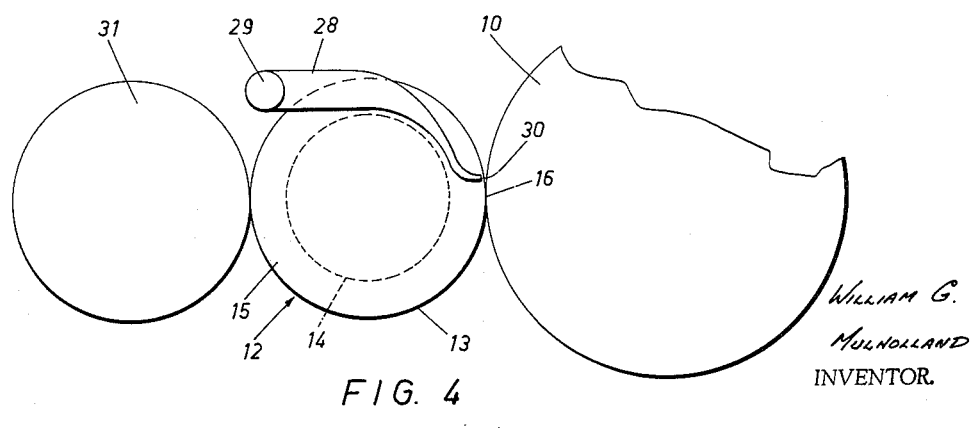
WILLIAM G.
MULHOLLAND
INVENTOR.
BY
Attorney Feb. 8, 1966 W. G. MULHOLLAND 3,234,066
PROCESS FOR PRODUCING THIN LAMINATED PLASTIC FILMS
Filed May 11, 1962 2 Sheets-Sheet 2

WILLIAM G. MULHOLLAND
INVENTOR.

BY
Attorney

3,234,066
PROCESS FOR PRODUCING THIN LAMINATED PLASTIC FILMS
William G. Mulholland, Waterloo, Ontario, Canada, assignor to Polycoating & Films Limited, Kitchener, Ontario, Canada and Campbell Containers Limited, Waterloo, Ontario, Canada
Filed May 11, 1962, Ser. No. 193,961
3 Claims. (Cl. 156—244)

This invention relates to processes for producing thin laminated plastic films and to the films produced by such processes. More particularly, this invention relates to processes for producing thin laminated plastic films by producing a clear cast thermoplastic film and simultaneously combining it, while still hot, with a thin thermoplastic film having printed matter thereon to produce a thin laminated plastic film so constructed that all the printing inks are locked in the film. As will become more apparent hereafter, the sealability of such a laminated film is not impaired, since all inks ars locked in the film, and furthermore, such a film complies with food and drug regulations which require that no printing ink should come into contact with the food packaged in a printed wrapper.

In the past, in the making of bread wrappers or the like, it has been common practice to make the wrapper of polyethylene film and, during the wrapping of the bread with such a wrapper, to insert a ring of wax paper bearing advertising material or the like between the polyethylene wrapper and the bread. This process is disadvantageous for a number of reasons. Two operations are required, namely the placing of the wrapper and the placing of the ring of wax paper, and consequently the process is relatively expensive and inconvenient. Furthermore, it is sometimes difficult to remove bread from the wrapper because of the presence of the ring of wax paper.

It also has been attempted in the past to take a strip of printed polyethylene film and glue it to a sheet of clear polyethylene. It will be appreciated that such a process and the resultant product is expensive. Moreover, this is a two step process requiring first the formation of the polyethylene sheets, and second the gluing together thereof.

Accordingly, it is one object of my invention to provide processes and apparatus for producing thin laminated plastic films, such films being produced in a one step operation, i.e., simultaneously with the formation of a cast thermoplastic film which forms a part of the resultant laminated film. In other words, it is an object of my invention to simultaneously cast a thermoplastic film and laminate to it, while it is still molten, another thermoplastic film.

It is another object of my invention to produce inexpensively a thin laminated plastic film.

It is yet another object of my invention to produce a thin laminated plastic film wherein printing ink on one member of the laminated film is locked in the film, which film therefore may be used for the wrapping of food.

One objection to a prior art type of film which consists only of a printed polyethylene sheet is that such a film is difficult to heat seal to itself, as the printed portions of the sheet require considerably more heat for sealing than do the clear portions of the sheet, and consequently, where single heat sealing means at a constant temperature are employed to heat seal such a film, it is difficult to obtain a firm seal all the way across the film.

Accordingly, it is a further object of my invention to provide a thin laminated plastic film having printed matter incorporated therein but which is readily heat sealable to itself.

As is well known, thin plastic films of polyethylene and polypropylene are commonly produced by casting. In this process a molten plastic film is extruded tangentially onto a chill roll from suitable die extrusion means, the chill roll being maintained at a relatively low temperature and commonly having a highly polished chrome surface. The film is led about one-half of the way around the periphery of the chill roll before being led off to a suitable winding apparatus. A common chill roll is about 18" in diameter, and the peripheral distance on such a chill roll required for casting of the film is about three inches. In other words, while the film is molten when it first contacts the chill roll, the film contacting the chill roll about three inches along the surface of the chill roll from the point of first contact has solidified or is cast.

It also is known, where it is desired to provide a laminated film which consists of a coating of plastic film such as polyethylene or polypropylene bonded to a substrate such as paper, cellophane, etc., of the same width as the plastic film, to produce such a laminated film by what is known as the extrusion coating process. In accordance with this process a molten plastic film is extruded into the nip between a chill roll and a pressure roll, and the substrate is fed over the pressure roll and through the nip. The molten plastic film and substrate are fused together at the nip to form a laminated film which is led over about one-half of the periphery of the chill roll before being led off to a suitable reel.

While extrusion coating may be employed where the plastic film and the substrate are of the same width, it is not possible to successfully employ such a technique where the substrate is of less width than the extruded plastic film, as the extruded plastic film, by virtue of its marginal contact with the pressure roll, reflects the surface of the pressure roll, i.e., the marginal portions of the extruded plastic film become cloudy and unacceptable.

In accordance with this invention the aforementioned problem is obviated by extruding a first thin film of thermoplastic material capable of being cast, casting this film, and fusing to the first film a second thin film of thermoplastic material during casting of the first thin film and while this first film is still molten, the second film being narrower than the first film and the marginal portions of the first film not overlapped by the second film being maintained out of contact with a pressure roll during passage of the two films between the nip defined between the pressure roll and a chill roll onto which the first film is extruded.

In brief, apparatus embodying my invention and for producing a thin laminated plastic film comprises a chill roll, a pressure roll, plastic film extruding means and a first thin film of thermoplastic material capable of being fused to a second thin film of thermoplastic material, the second film being capable of being cast. The first and second films make up the laminated plastic film. The pressure roll includes at least one raised surface and at least one depressed surface. The pressure roll and the chill roll are positioned side-by-side and define a nip therebetween.

The extruding means extrude the second film in a molten state onto the chill roll ahead of the nip. A first portion of the second film passes between the chill roll and the raised surface, while a second portion of the second film passes between the chill roll and the depressed surface. The first film is of at least substantially the same width as the raised surface and is led over the raised surface and through the nip. The first film contacts the first portion of the second film at the nip and becomes fused to the second film.

My invention will become more apparent from the following detailed description taken in conjunction with the drawings, in which:

FIGURE 1 is a schematic side elevation of apparatus embodying my invention;

FIGURE 2 is a plan view of the pressure roll shown in FIGURE 1;

FIGURE 3 is a schematic side elevation of apparatus embodying my invention;

FIGURE 4 is a schematic side elevation of different apparatus embodying my invention;

Figure 5:
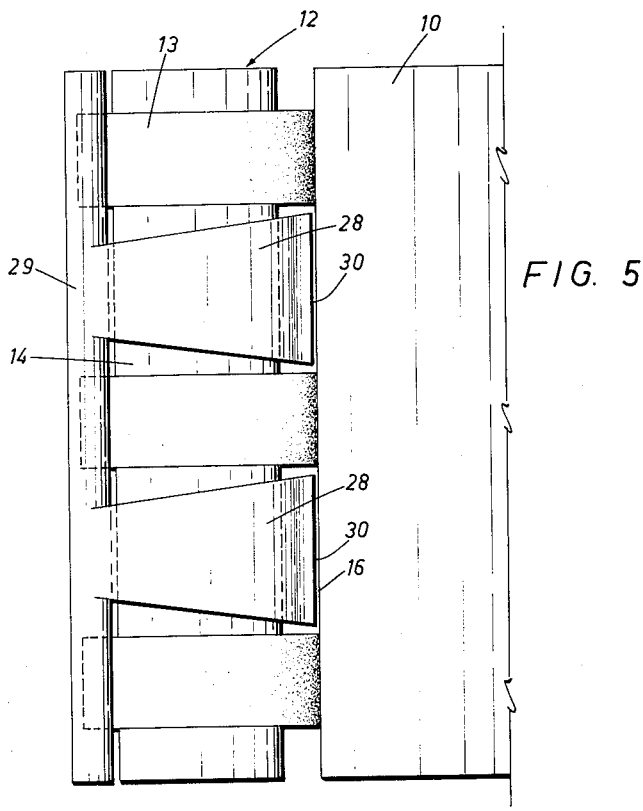
FIGURE 5 is a top elevation of the pressure roll and part of the chill roll shown in FIGURE 4

Referring first to FIGURES 1 and 2, I have shown a conventional chill roll 10 which may be cooled in any suitable manner well known in the art, a conventional extrusion die 11 and a pressure roll 12. As best seen in FIGURE 2, pressure roll 12 has a plurality of aligned raised surfaces 13 which are spaced apart longitudinally from each other by depressed surfaces 14. Preferably raised surfaces 13 are the outer surfaces of silicone rubber bands 15.

Pressure roll 12 and chill roll 10 are positioned side-by-side and define a nip 16 therebetween.

As best seen in FIGURE 1, extrusion die 11 extrudes a thin thermoplastic film 17 in a molten state onto chill roll 10 at 18 ahead of nip 16, film 17 being capable of being cast. First portions 19 of film 17 pass between chill roll 10 and raised surfaces 13, while second portions 20 of film 17 pass between chill roll 10 and depressed surfaces 14 and are out of contact with depressed surfaces 14.

A plurality of thin thermoplastic films 21 each capable of being fused to film 17 are led over raised surfaces 13 and through nip 16. It should be noted that the width of each of films 21 is the same as the width of its cooperating raised surface 13. Films 21 contact first portions 19 of film 17 at nip 16 where film 17 is still molten and films 21 are fused thereto. The laminated film 22 produced with such apparatus is lead around part of the periphery of chill roll 10 as shown in FIGURE 1 and subsequently treated in a manner which will hereinafter be discussed in connection with FIGURE 3.

My invention may be practised with any thermoplastic film 17 which is capable of being cast, polyethylene and polypropylene being preferred materials. Films 21 may be of any thermoplastic material which is capable of being fused to film 17. Again polyethylene and polypropylene are preferred. Films 21 also could be of paper or other substrate coated on surface 23 with a material such as polyethylene, and the terminology, "second film of thermoplastic material" where used herein is intended to cover such a film.

The surfaces 23 of films 21 may have printing thereon in the form of words or designs or both. It will be noted that printed surfaces 23 are locked in laminated film 22. Preferably film 17 is clear polyethylene or polypropylene, while films 21 are coloured polyethylene or polypropylene, white polyethylene or polypropylene being suitable. In such cases, while the different inks on surfaces 23 of films 21 are locked in laminated film 22, both outer surfaces of film 22 are completely of polyethylene or polypropylene and hence film 22 can be readily heat sealed to itself.

Turning now to FIGURE 3, it will be seen that laminated film 22 is led over calender rolls 24 and subsequently wound on a reel 25. Films 21 are wound on a plurality of side-by-side supply reels 26 (only one shown), and reserve supply reels 27 may be provided.

In the embodiment of my invention shown in FIGURES 4 and 5, a plurality of air knives 28 are provided, these being provided with air from a header 29 supplied from a suitable source (not shown). Each air knife has an outlet 30 positioned adjacent nip 16, and each directs air against second portions 20 of film 17 to ensure contact between these portions and the surface of chill roll 10, thus ensuring good casting of film 17. A cooling roll 31 is provided to cool raised surfaces 13, this roll 31 being cooled internally in any conventional manner.

I have found that where a chill roll of 18″ diameter and a pressure roll of 12″ diameter (measured to depressed surface 14) are employed, raised surfaces 13 should be not less than about 3/16″ above depressed surfaces 14 so as to avoid any tendency for pressure roll 12 to attract film 17 at nip 16, thereby loosening the contact between film 17 and chill roll 10 and permitting the entrapment of air between film 17 and chill roll 10 to the detriment of films 17 and 22.

Surfaces 13 are selected to be of a material which is adapted to release from film 17 when this film is molten. Silicone rubber is a particularly suitable material, for bands 15 because of its excellent separation qualities when in contact with a hot melt and because of its availability as a room temperature vlucanizing compound. It will be appreciated, however, that other materials might also serve the same function, and, in some applications it might be possible to employ a material such as "Teflon" (trademark), for example.

It should be noted that in practising my invention extrusion die 11 can be constructed so that portions 19 of film 17 are thinner than portions 20, so as to avoid a laminated film which is overly bulky due to the fusing together of portions 19 and films 21. For example, where films 21 and portions 20 each are 1 mil thick, portions 19 could be ¾ mils thick.

Figure 6:
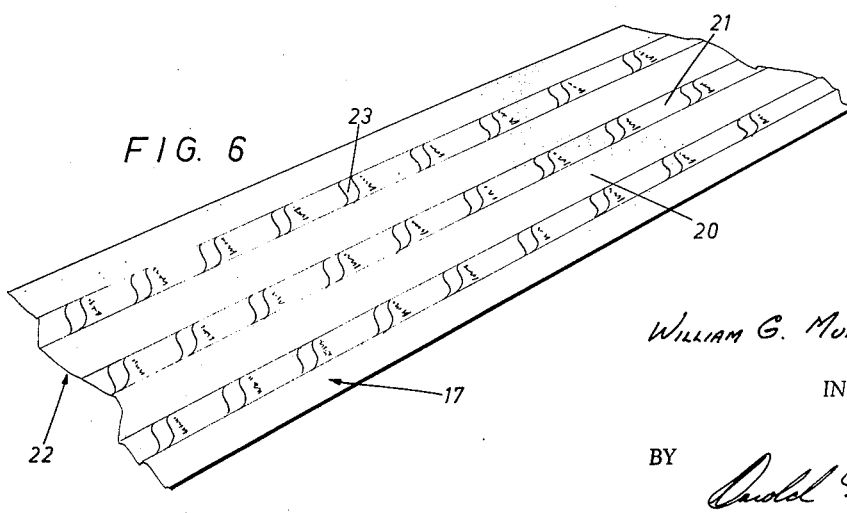
FIGURE 6 shows laminated film produced in accordance with my invention.

Laminated film 22 produced in accordance with my invention is shown in FIGURE 6. Such film is particularly suited for wrapping bread and soft goods, for example. It will be understood, of course, that prior to use as a wrapper, film 22 is slit intermediate films 21, i.e., in the center of portions 20, so that each wrapper has a single film 21 having portions 20 on either side thereof.

It will be apparent from the foregoing that in practising a process embodying my invention a film 17 of thermoplastic material capable of being cast, and preferably of polyethylene or polypropylene, is extruded onto a chill roll 10 ahead of the nip 16 between the chill roll 10 and a pressure roll 12. A first portion 20 of film 17 is maintained out of contact with pressure roll 12. Film 17 is cast. A second thin film 21 of thermoplastic materal of lesser width than film 17 is led over pressure roll 12, film 21 contacting and fusing to a second portion 19 of film 17 during casting of film 17 and while film 17 is molten.

It is important to note that because films 21 are the same width as raised surfaces 13, and because of the provision of depressed surfaces 14, there is no contact between pressure roll 12 and portions 20 of film 17, and hence portions 20 do not become cloudy, and hence unacceptable.

While I have described certain preferred embodiments of my invention, those skilled in the art will appreciate that changes and modifications may be made therein without departing from the spirit and scope of my invention as set out in the appended claims.

What I claim as my invention is:

1. Process for producing a laminate of a thin plastic film and a plurality of thin film strips of thermoplastic material of less width than said film which comprises extruding a thin film of molten thermoplastic onto a rotatable chill roll ahead of the nip between said chill roll and a parallel cooperating rotatable pressure roll having a plurality of spaced circumferential raised resilient surface portions and a depressed circumferential surface portion between each of said raised portions, leading a plurality of preformed thin film strips of thermoplastic material each of which is of lesser width than the extruded film and of the same width as the circumferential raised surface portions of said pressure roll one over each said circumferential raised surface portions in contact with and overlaying only the width of the same through the nip into contacting fusing relation with the plastic film on said chill roll while maintaining the remainder of the width of said extruded film on the chill roll out of contact with the depressed portion of said pressure roller.

2. Process according to claim 1 wherein the circumferential raised portions of the rotatable pressure roller is formed of silicone rubber.

3. Process according to claim 1 wherein the thermoplastic material of the films is selected from the class consisting of polyethylene and polypropylene.

References Cited by the Examiner
UNITED STATES PATENTS

| | | | |
|---|---|---|---|
| 2,673,643 | 3/1954 | Blank et al. | 156—302 |
| 2,928,220 | 3/1960 | Kannengiesser et al. | |
| 3,017,302 | 1/1962 | Hultkrans | 156—309 |
| 3,058,863 | 10/1962 | Gaines et al. | |
| 3,070,481 | 12/1962 | Schornstheimer | 156—242 |
| 3,077,428 | 2/1963 | Heuser et al. | 156—311 |
| 3,130,647 | 4/1964 | Anderson et al. | 156—244 |

EARL M. BERGERT, *Primary Examiner.*

HAROLD ANSHER, *Examiner.*

V. A. MALLARE, T. R. SAVOIE, *Assistant Examiners.*